US010242453B2

(12) United States Patent
Cameron et al.

(10) Patent No.: US 10,242,453 B2
(45) Date of Patent: Mar. 26, 2019

(54) SIMULTANEOUS LOCALIZATION AND MAPPING INITIALIZATION

(71) Applicant: Longsand Limited, Cambridge (GB)

(72) Inventors: Pashmina Cameron, Cambridge (GB); George Saklatvala, Cambridge (GB)

(73) Assignee: LONGSAND LIMITED, Cambridge (GB)

(*) Notice: Subject to any disclaimer, the term of this patent is extended or adjusted under 35 U.S.C. 154(b) by 17 days.

(21) Appl. No.: 15/120,405

(22) PCT Filed: Apr. 30, 2014

(86) PCT No.: PCT/EP2014/058830
§ 371 (c)(1),
(2) Date: Aug. 19, 2016

(87) PCT Pub. No.: WO2015/165523
PCT Pub. Date: Nov. 5, 2015

(65) Prior Publication Data
US 2017/0069096 A1    Mar. 9, 2017

(51) Int. Cl.
| G06K 9/00 | (2006.01) |
| G06T 7/32 | (2017.01) |
| G06T 7/579 | (2017.01) |
| G06T 7/246 | (2017.01) |
| G06T 7/33 | (2017.01) |

(52) U.S. Cl.
CPC ............... *G06T 7/32* (2017.01); *G06T 7/246* (2017.01); *G06T 7/337* (2017.01); *G06T 7/579* (2017.01); *G06T 2207/10016* (2013.01); *G06T 2207/10028* (2013.01)

(58) Field of Classification Search
None
See application file for complete search history.

(56) References Cited

U.S. PATENT DOCUMENTS

| 8,675,997 B2* | 3/2014 | Zuniga | G06K 9/4671 382/260 |
| 2005/0238200 A1* | 10/2005 | Gupta | G06K 9/00201 382/103 |
| 2007/0262884 A1* | 11/2007 | Goncalves | G01C 21/12 340/995.24 |
| 2012/0121161 A1* | 5/2012 | Eade | G09B 29/007 382/153 |

(Continued)

FOREIGN PATENT DOCUMENTS

| WO | WO-2012062813 | 5/2012 |
| WO | WO-2012100829 | 8/2012 |
| WO | WO-2012163912 | 12/2012 |

OTHER PUBLICATIONS

David Nister, "Frame Decimation for Stucture and Motion", Visual Technology, Ericsson reaserch, Ericsson Radio Systems, Sweden, Retrieved Aug. 18, 2016, 18 pages.

(Continued)

*Primary Examiner* — Hadi Akhavannik (57) ABSTRACT

A pair of video frames may be used for simultaneous localization and mapping (SLAM) initialization. The pair of frames may be determined according to a translation threshold. Whether the translation threshold is met may be determined by obtaining the pair of video frames and estimating the translation between the frames.

16 Claims, 6 Drawing Sheets

(56) References Cited

U.S. PATENT DOCUMENTS

2013/0155058 A1  6/2013  Goldparvar Fard et al.
2014/0003705 A1* 1/2014  Taguchi .................. G06T 7/344
                                                    382/154
2014/0293016 A1* 10/2014 Benhimane ............. G06T 17/00
                                                    348/50

OTHER PUBLICATIONS

Eric Royer et al. "Monocular Vision for Mobile Robpt Localization and Autonomous Navigation", International Journal of Computer Vision 74(3), 237-260, 2007, 24 pages.
Fei Dai et al. "Generating the Sparse Point Cloud of a Civil Infrastructure Scene Using a Single Video Camera Under Practical Contraints", Proceedings of the 2011 Winter Simulation Conference 2011 12 pages.
International Searching Authority, "Notification of Transmittal of the International Search Report and the Written Opinion", PCT/EP2014/058830, Jan. 5, 2015 16 pages.
Jae Kyu Suhr et al. "Automatic Free Parking Space Detection Using Motion Stereo-Based 3D Reconstruction", Machine Vision and Application, 2010, 21:163-176.
Lakemond Ruan et al. "Evaluation of Two-View Geometry Methods With Automatic Ground-Truth Generation", Image and Vision Computing 31, 2013, 912-934.
Mark R Stevens. "A Scoring, Truthing, and Registering Toolkit for ATR Evaluation", Charles River Analytics, Cambridge, MA, 2003, 10 pages.
Mota-Gutierrez, S. A. et al., "Learning Depth From Appearance for Fast One-Shot 3-D Map Initialization in VSLAM Systems", (Research Paper), May 6-10, 2013, 6 pages.
Mulloni, A. et al., "User Friendly SLAM Initialization", (Research Paper), Oct. 1-4, 2013, 10 pages.
Petri Tanskanen et al., "Live Metric 3d Reconstruction on Mobile Phones", (Research Paper), Dec. 4, 2013, 8 pages.
Philip Torr. "The Problem of Degeneracy in Structure and Motion Recovery From Uncalibrated Image Sequences", International Journal of Computer Vision 32(1), 1999, 27-44.
Zhenhe Chen et al. "Implementation of an Update Scheme for Monocular Visual SLAM", Department of Electrical and Computer Engineering, Ontario, Canada, 2006, 6 pages.
Kanatani, "Analysis of 3-D Rotation fitting", IEEE Transactions on Pattern Analysis and Machine Intelligence, vol. 16, No. 5, May 1994, 7 pages.
Klein, et al., "Parallel Tracking and Mapping for Small AR Workspaces", Proceedings of the 2007 6th IEEE and ACM International Symposium on Mixed and Augmented Reality ISMAR 07, Nov. 2007, 10 pages.
Klein, et al., "Parallel Tracking and Mapping on a Camera Phone", Proceeding of the 2009 8th IEEE and ACM International Symposium on Mixed and Augmented Reality ISMAR 09, Oct. 2009, 4 pages.

* cited by examiner

SIMULTANEOUS LOCALIZATION AND MAPPING INITIALIZATION

BACKGROUND

Simultaneous localization and mapping (SLAM) is a technique used to build up a map within an unknown environment or to update a map within a known environment while at the same time keeping track of the current location. Mapping is a problem of integrating sensor information, such as video, into a consistent model and depicting that information in a representation. Localization is a problem of estimating the location, and sometimes the pose, of a sensor.

BRIEF DESCRIPTION OF THE DRAWINGS

Certain examples are described in the following detailed description and in reference to the drawings, in which.

DETAILED DESCRIPTION OF SPECIFIC EXAMPLES

Simultaneous localization and mapping (SLAM) systems operating on video input may use stereo initialization on two video frames. When two suitable initial frames are obtained, stereo initialization may be performed using various pose determination techniques, such as five point pose methods, sometimes called the five point pose algorithm, and random sample consensus (RANSAC) techniques. The success of stereo initialization depends on having an appropriate spatial transformation between the two initial frames.

Some techniques for initialization make assumptions regarding the video. For example, some techniques assume that the camera is initially viewing a plane. Additional techniques for stereo initialization require user input and control in obtaining the two initial frames. For example, a technique may require a user to hold a camera and press a key to indicate the first of the two frames used in initialization. The user may then be required to perform a smooth predefined camera motion that includes translation before pressing the key again to indicate the second frame used in initialization. Other techniques may attempt SLAM initialization using multiple initial frame pairs to initialize multiple maps. The correct map may be selected from the multiple maps using user input or various automatic selection techniques.

These techniques are not usable in situations where there is lack of user control over the environment or the camera. For example, these methods may be unable to perform SLAM on videos such as video transmitted or stored by unmanned aerial vehicles (UAV), balloons, unmanned submersible vehicles or wearable cameras, pre-recorded videos, or other videos that may have degenerate camera motion. Additionally, techniques that perform multiple map initializations may be computationally expensive.

Aspects of the present disclosure may allow automatic selection of initial frames for stereo initialization of a SLAM method. Additionally, some aspects may allow initial frame selection without initial camera view requirements and without multiple SLAM initializations. In some cases, SLAM initialization may occur with requiring users to press keys or perform predefined camera motions and without initializing multiple maps. For example, initial frames may be selected without assuming that one of the initial frames is a view of a plane. In some implementations, automatic initial frame selection may be used in situations where the SLAM system lacks controller over camera movement or the scene being viewed. For example, automatic initial frame selection may be performed on video transmitted by unmanned aerial vehicles (UAV), balloons, unmanned submersible vehicles, or pre-recorded videos.

Figure 1:
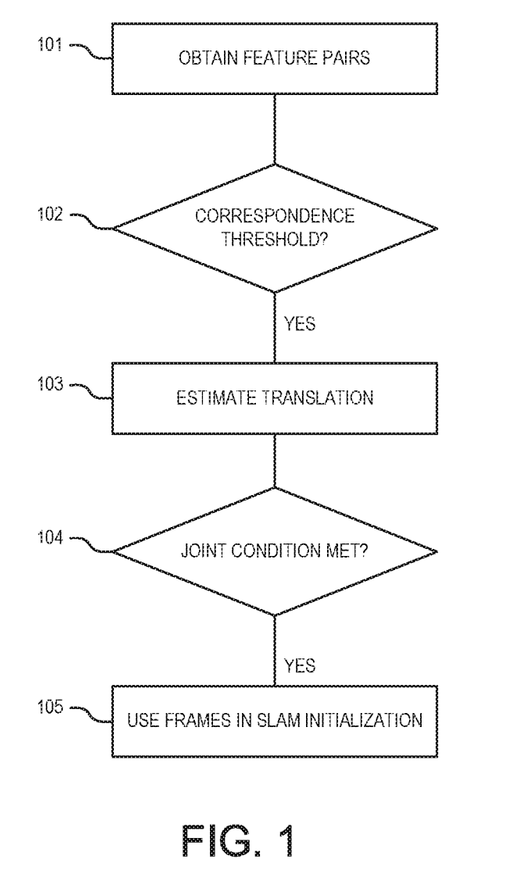
FIG. 1 illustrates an example method of obtaining a pair of initial frames for simultaneous localization and mapping (SLAM)

FIG. 1 illustrates an example method of obtaining a pair of initial frames for SLAM. For example, the method may be performed by a localization and mapping system of a system capable of directly capturing video, such as a robotic vehicle, a UAV, a smartphone, or a wearable device. As another example, the method may be performed on received or pre-recorded video.

The example method may include block 101. Block 101 may include obtaining a set of corresponding feature pairs from a pair of video frames. Each corresponding feature pair (each "correspondence") may include a feature from a first feature set from a first video frame and a corresponding feature from a second feature set of a second video frame. The set of corresponding feature pairs may be pairs of matching features from the first video frame and the second video frame. Each element of the first feature set may correspond to an element of second feature set. Accordingly, the first feature set corresponds to, or matches, the second feature set, if the same physical point (or line) has been imaged in both frames and the feature descriptors matched each other. In some cases, the features may be represented by the ray that originates at the image point and run along the line joining the camera center and the image point.

For example, block 101 may include obtaining the set of corresponding feature pairs through feature detection and feature matching. The features may be various features extractable from video frames, such as interest points, lines, contours, or regions. Feature pairs may be identified by extracting a descriptor at the features from both video frames, matching the descriptors and then selecting the matches that have a score greater than a certain threshold.

The example method further includes block 102. Block 102 may include determining whether the size of the set of corresponding feature pairs meets a correspondence threshold condition. While theoretically fewer correspondences are enough, the pose estimation gives better results when there are more correspondences. For example, the system may require a minimum of 15-20 correspondences to be present. If this condition is not met, the system may bail out and go back to block 101 in order to start the process again with a different pair of frames. The first of the pair of frames may be replaced at regular time intervals and the second may be replaced whenever a new frame becomes available.

The example method may also include block 103. Block 103 may include estimating a transformation between the first feature set and the second feature set. In some implementations, the transformation is the two-dimensional (2D) rotation and translation between the feature sets in the image plane. The component of translation perpendicular to the image plane (in the direction of the camera axis) does not constrain the depths of the features. Therefore, computing the translation in the two dimensions of the image plane (or the projection of the three-dimensional (3D) translation vector onto the image plane) is enough to determine the baseline. For example, the translation may be estimated as the vector between the two centroids of the first feature set and the second feature set in a two dimensional global coordinate system. In some cases, block 103 may further include determining the magnitude of the translation (baseline).

The example method may further include block 104. Block 104 may include determining whether the correspondences and the translation meet a joint condition.

In some implementations, the joint condition may be met if the magnitude of the translation exceeds a translation threshold and the number of correspondences exceeds a correspondence threshold.

In some implementations, the correspondence threshold may depend on the magnitude of the translation. The correspondence threshold may therefore be different from the number of correspondences required to meet the condition in block 102. For example, for very small baselines, the angle subtended by the image rays on to the baseline is large (close to 90°), which leads to inaccurate triangulations, and hence the correspondence threshold will be large. For intermediate baselines, the angle subtended by the rays on to the baseline is close to 60°, the triangulation is precise, and hence the correspondence threshold may be lower. For large baselines, the triangulations will be inaccurate again and the feature matching will be inaccurate as well, and hence the correspondence threshold may be higher. For small translations, the amount of overlap (the amount of common area imaged in both frames) in the pair of frames is large, hence it is possible to obtain more correspondences. When the translation is large, the amount of overlap in the pair of frames is small, which may result in a small number of correspondences.

In some implementations, block 102 includes assigning a threshold score to the two frames based on the degree to which the translation magnitude exceeds the minimum magnitude.

In some implementations, block 102 includes assigning a score to the two frames based on the degree to which the number of correspondences exceeds the correspondence threshold. In some implementations, block 102 includes a combination of the two scores to produce a joint score in order to decide if the joint condition is met. In some implementations, block 102 includes a decision function based on the two separate scores without combining the two scores.

The accuracy of triangulation (the process of determining the three dimensional (3D) position of a point) depends on the angle between the rays used to triangulate the point, which in turn depends on the magnitude of the translation vector between the two views of the point. Accordingly, the magnitude of the translation may provide a baseline measure for evaluating whether the two frames are suitable for SLAM initialization.

In some implementations, the translation threshold condition is based on the smallest movement in the position of a 3D point that can be measured in the image plane assuming that the point is at a distance of one focal length. In some cases, the focal length is obtained a priori as the actual focal length of the camera used to record the video frames. In other cases, a reasonable assumption for the focal length may provide suitable discrimination of initial frames. Once SLAM is initialized, other methods may be used to determine the focal length from feature correspondences and relative pose information. In some implementations, an angle less than 90°, such as 87° may be used to determine the minimum threshold magnitude. In some cases, the translation threshold may be set higher than the minimum threshold magnitude in order to guarantee a certain quality of initialization.

The system may include a SLAM initialization block 105. Block 105 may include a five-point pose algorithm which requires 5 correspondences to compute a pose, and a further few correspondences to check the pose, so any number greater than 5 should suffice as the correspondence threshold.

In some implementations, block 102 may include determining if the number of correspondences exceeds a minimum number of correspondences required for a pose determination method to be used in SLAM initialization. For example, in implementations using a five point pose technique, the correspondence threshold condition may be the minimum number of correspondences required to reliably solve the five-point technique reliably. For example, the correspondence threshold may be 15-20 correspondences. In some cases, block 105 may further include determining a correspondence score as the degree to which the number of correspondences exceeds the minimum.

In some implementations, the correspondence threshold may depend on the translation. For example, if block 102 includes assigning a translation score to the two video frames, the translation score may be used in block 105 to determine the correspondence threshold. In some cases, blocks 102 and 105 may be performed to determine if the combined threshold and correspondence scores meet a combined threshold. The combined threshold may be greater than the sum of the translation threshold and the correspondence threshold. For example, to qualify as initial frames for SLAM, the two frames may have to meet both minimums and exceed at least one of the minimums to meet the combined threshold.

The example method may further include block 105. Block 105 may include using a pair of video frames selected in blocks 101-104 for initialization in a simultaneous localization and mapping (SLAM) method. In some implementations, block 105 may include using a five-point pose technique and a RANSAC technique. The five-point pose technique may use a subset of five of the correspondences to generate a number of solutions as plausible essential matrices. In some cases, the five point subset of the set of corresponding feature pairs is selected to generate the solution that gets the best consensus (least re-projection error) over all of the correspondences. From each essential matrix, four poses are generated. In some cases, points may be triangulated to determine which of the four poses places the points in front of both the cameras, and that pose may be selected.

A focal length for the camera used to generate the video is used for the initial SLAM pose estimation through five-point pose and RANSAC. However, the focal length used in this process may differ slightly from the actual focal length of the camera that recorded the video. As the SLAM method continues, the pose tracking and mapping may generate a more accurate estimation of the actual focal length of the camera.

Figure 2:
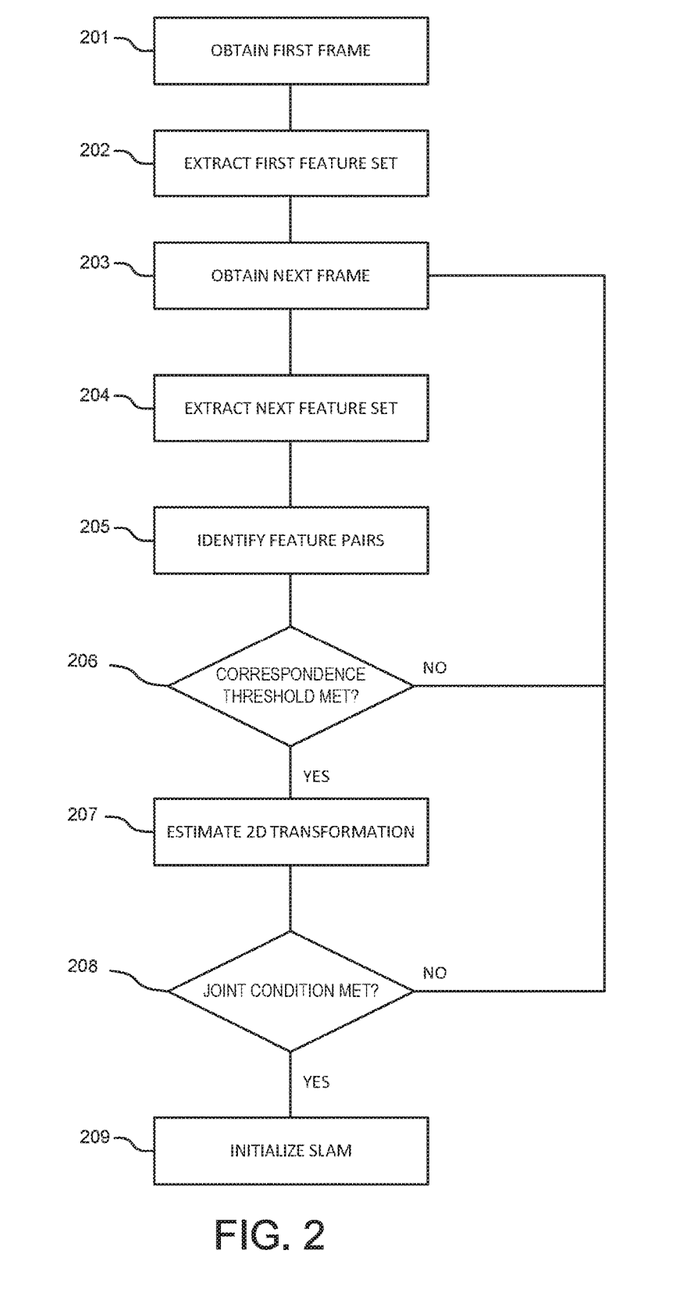
FIG. 2 illustrates an example method of iteratively evaluating frames to obtain a pair of frames suitable for SLAM initialization.

FIG. 2 illustrates an example method of iteratively evaluating frames to obtain a pair of frames suitable for SLAM initialization. The method of FIG. 2 may involve performing the method of FIG. 1 by repeating some of the blocks for multiple frames. For example, the method may be performed by a localization and mapping system of a system capable of directly capturing video, such as a robotic vehicle, a UAV, a smartphone, or a wearable device. As another example, the method may be performed on received or pre-recorded video.

The example method may include block 201. Block 201 may include obtaining a first video frame. For example, block 201 may include decoding a transmitted or recorded video stream and storing a first video frame in memory.

The example method may also include block 202. Block 202 may include extracting features of a first video frame. The extracted features may be a superset of the first feature set described with respect to block 101. The extracted features may be obtained by performing various feature extraction techniques on the first video frame. For example, block 202 may include performing corner extraction on the first video frame to identify a set of image points corresponding to corners in the frame scene.

The example method may also include block 203. Block 203 may include obtaining another video frame. For example, the next video frame may be the frame immediately succeeding the previous frame (the first frame obtained in block 201, or the frame obtained in the last performance of block 203). As another example, the next video frame may be some number of frames after the previous frame. In some cases, every frame following the first frame may be evaluated against the first frame for a certain time interval. After a preset time interval the first frame may be replaced and the cycle repeated with frames following the new first frame.

The example method may further include block 204. Block 204 may include extracting features of the next video frame. The extracted features may be a superset of the second feature set described with respect to block 101. For example, the extracted features may be obtained by the same method as used in block 201.

The example method may further include block 205. Block 205 may include identifying corresponding features from the extracted features of the first video frame and the next video frame. Block 205 may be used to obtain the set of corresponding feature pairs described with respect to block 101. Block 205 may include performing feature matching to identify a subset of the features extracted in block 202 and a subset of the features extracted in block 204 that match each other. As described with respect to block 101, feature pairs may be identified by extracting a descriptor at the features from both video frames, matching the descriptors and then selecting the matches that have a score greater than a certain threshold. Once feature pairs are identified, rest of the features from both feature sets may be discarded.

The example method may further include block 206. As with respect to block 102, block 206 may include determining if the number of correspondences exceeds a minimum number of correspondences required for a pose determination method to be used in SLAM initialization. The system may bail out and return to block 203 to obtain a new second frame for evaluation against the existing first frame. The condition used in block 206 may be a superset of the conditions used in block 102 and similar assumptions may apply. For example, the system may require 15-20 correspondences to be present.

The example method may further include block 207. Block 207 may include estimating a 2D transformation from the first feature set to the next feature set. For example, the 2D transformation may be a rigid transformation including a 2D rotation and a 2D translation. In some implementations, the 2D transformation may be used to determine the translation described with respect to block 103.

Figure 3:
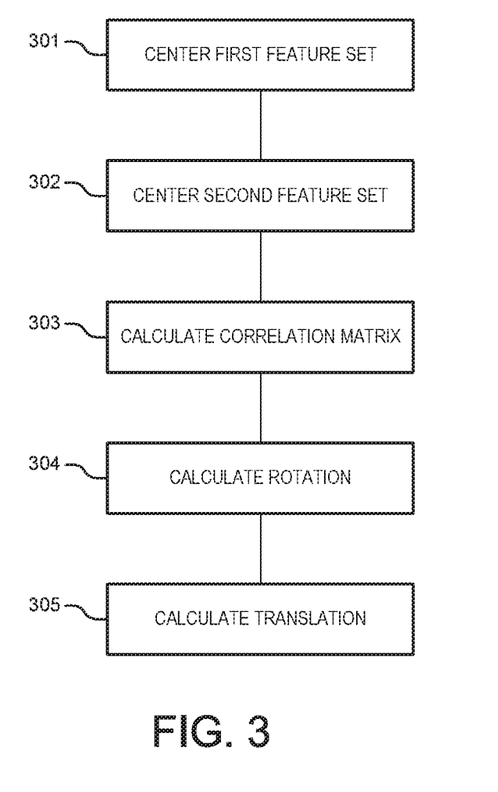
FIG. 3 illustrates an example method of estimating a two-dimensional translation between a pair of feature sets obtained from the pair of frames described with respect to FIG. 2.

FIG. 3 illustrates an example method of performing block 207. The example method may include block 301. Block 301 may include centering the first feature set. The first feature set may be centered by subtracting the set's centroid from the features of first feature set.

The example method may further include block 302. Block 302 may include centering the second feature set. The second feature set may be centered by subtracting the set's centroid from the points of the second feature set.

The example method may further include block 303. Block 303 may include calculating a correlation matrix between the centered first feature set and the centered second feature set.

The example method may further include block 304. Block 304 may include calculating a rotation from the centered first feature set to the centered second feature set. For example, singular value decomposition may be performed on the correlation matrix to determine the rotation.

The example method may further include block 305. Block 305 may include calculating the translation by a vector joining the first centroid and the second centroid. For example, the translation may be the vector joining the second centroid and the rotated first centroid under the rotation determined in block 204.

Returning to FIG. 2, the example method may further include block 208. Block 208 may include determining if the size of the set of corresponding feature pairs from block 205 and the translation of the 2D transformation from block 207 meet a joint condition. For example, block 208 may be performed as described with respect to block 104. As an example, the joint condition may include a threshold on the magnitude of the translation obtained in block 207 and a threshold on the size of the set of correspondences obtained in block 205. The threshold on the size of the set of correspondences in block 208 may depend on the translation or may be a function of the translation and hence may be different from the threshold used in block 206.

If the joint condition is not met, the method may repeat from block 203. Accordingly, the method may proceed until the first frame and a latter frame are found to have sufficient correspondences and translation such that the joint condition in block 208 is met. In some cases, if these conditions are not met within a certain time or a certain number of frames, the method may repeat from block 201, such that the next frame in the video is taken as the first frame. The method may thus proceed until a pair of frames suitable for SLAM initialization is found.

When the joint condition is met, the method may proceed to block 209. Block 209 may include using the selected pair of video frames for initializing a SLAM method. For example, block 209 may be performed as described with respect to block 105.

Figure 4:
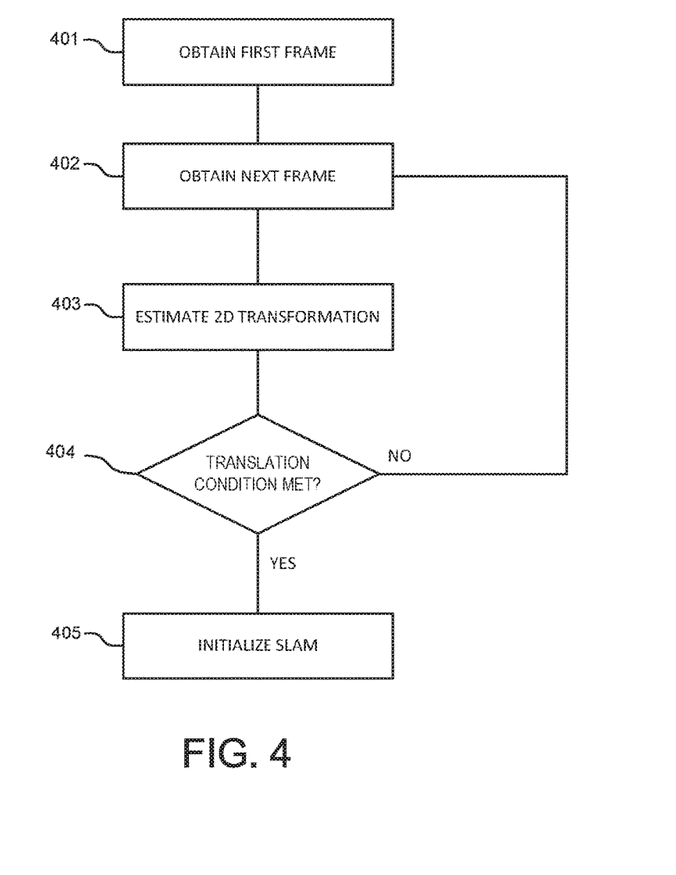
FIG. 4 illustrates an example method of iteratively evaluating frames to obtain a pair of initial frames suitable for SLAM initialization using whole image matching techniques.

FIG. 4 illustrates an example method of iteratively evaluating frames to obtain a pair of frames suitable for SLAM initialization using whole image matching techniques. For example, the method may be performed by a localization and mapping system of a system capable of directly capturing video, such as a robotic vehicle, a UAV, a smartphone, or a wearable device. As another example, the method may be performed on received or pre-recorded video.

The example method may include blocks 401 and 402, which may be performed as described with respect to blocks 201 and 203 of FIG. 2. Further, it may include block 403. Block 403 may include estimating a 2D transformation between the pair of frames obtained in blocks 401 and 402. For example, block 403 may include using image registration or cross-correlation over the two video frames to estimate a 2D transformation between the video frames. This example differs from the example method from FIG. 2 in that no local features are extracted and no correspondences are estimated. Instead image registration or cross correlation provides a 2D transformation vector between the two video frames. Accordingly, block 207 of FIG. 2 is not performed on the frames obtained in blocks 401 and 402.

The translation estimated in block 403 may be compared to a translation threshold in block 404. If the translation condition is met, the method proceeds to block 405 where local features required for SLAM initialization may be extracted and SLAM initialization may be performed. If the translation condition is not met the method may repeat from block 402. In some cases, the first frame obtained in block 401 may be replaced after a certain time interval and the process may repeat from block 402 onwards.

Figure 5:
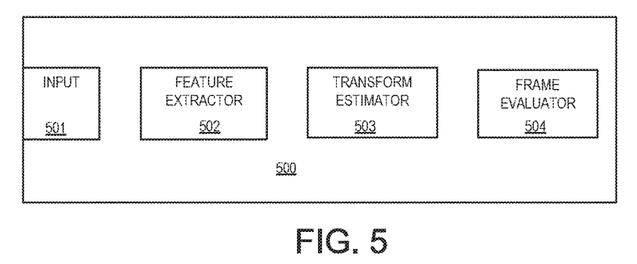
FIG. 5 illustrates an example system including a frame evaluator to determine if two video frames are suitable initial frames for a SLAM method.

FIG. 5 illustrates an example system 500 including a frame evaluator 504 to determine if two video frames are suitable initial frames for a SLAM method. For example, the system 500 may be a computer, a robotic vehicle, a UAV, a smartphone, or camera equipped device capable of performing SLAM. In some implementations, the illustrated modules 501-504 may be implemented by a processor executing instructions stored on a non-transitory computer readable, by hardware, or by a combination thereof.

The example system 500 may include a video input 501 to obtain video frames. For example, the video input 501 may be a camera, a storage volume storing a video stream, a decoder, or a receiver. For example, the video input 501 may perform blocks 201 and 203 of FIG. 2 or blocks 401 and 402 of FIG. 4.

The example system may further include a feature extractor 502. The feature extractor 502 may be used to detect a first set of rays from a first video frame and a corresponding set of rays from a second video frame. For example, the rays may be the back projection of 2D image points, and each ray from the first set and corresponding ray from the second set may represent a common feature in the first video frame and the second video frame. For example, the feature extractor 502 may obtain the sets of rays as described with respect to block 101 of FIG. 1 or blocks 202, 204, and 205 of FIG. 2.

The example system 500 may further include a transformation estimator 503. The transformation estimator 503 may estimate a transformation from the first set of rays to the second set of rays. The transformation may include a translation. For example, the transformation may be a 2D transformation including a translation and a rotation. In some implementations, the transformation estimator 503 may perform block 103 of FIG. 1, block 207 of FIG. 2, or block 403 of FIG. 4. For example, the transformation estimator 503 may perform the example method of FIG. 3.

The example system 500 may further include a frame evaluator 504. The frame evaluator 504 may determine if the first video frame and the second video frame are suitable as initial frames for SLAM. For example, the frame evaluator 504 may determine if the frames are suitable as initial frames using a joint condition on the translation and size of set of correspondences as described with respect to blocks 102 and 104 of FIG. 1 or block 206 and 208 of FIG. 2. As described above, in some implementations, the joint condition may be met for example, by having a minimum number of pairs of rays in the first and set sets of rays and a minimum translation from the first set of rays to the second set of rays. As another example, the frame evaluator 504 may determine if the frames are suitable as initial frames using only a translation threshold as described with respect to block 404 of FIG. 4.

Figure 6:
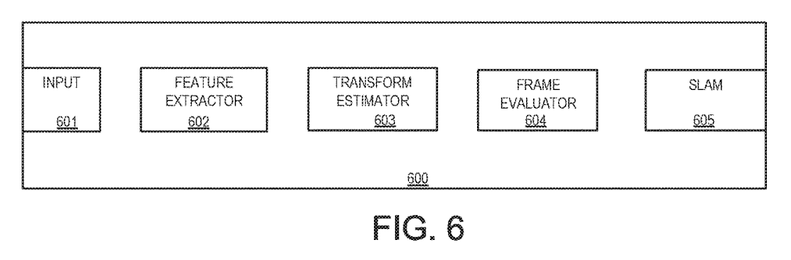
FIG. 6 illustrates an example system including a SLAM initializer.

FIG. 5 illustrates an example system 500 including a SLAM initializer 605. For example, the system 600 may be a computer, a robotic vehicle, a UAV, a smartphone, or camera equipped device capable of performing SLAM. In some implementations, the illustrated modules 601-605 may be implemented by a processor executing instructions stored on a non-transitory computer readable, by hardware, or by a combination thereof.

The example system 600 may include an input 601, a feature extractor 602, a transformation estimator 603, and a frame evaluator 604. These modules may be implemented as described with respect to input 501, feature extractor 502, transformation estimator 503, and frame evaluator 504 of FIG. 5.

The example system 600 may also include a SLAM initializer 605. The SLAM module 605 may perform SLAM initialization using the first video frame and second video frame as initial frames. For example, the SLAM initializer 605 may perform block 105 of FIG. 1, block 209 of FIG. 2, or block 405 of FIG. 4. Additionally, in some implementations, the SLAM module 605 may perform SLAM using subsequent video frames obtained from the input 601. For example, the SLAM module may perform SLAM as described above with respect to blocks 105 and 209.

Figure 7:
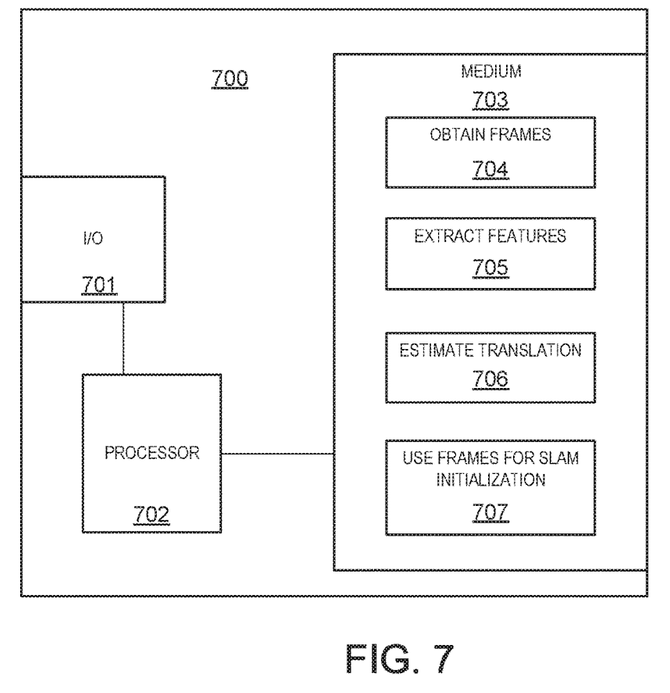
FIG. 7 illustrates an example system including a non-transitory computer readable medium storing instructions executable by a processor to perform SLAM initialization.

FIG. 7 illustrates an example system 700 including a non-transitory computer readable medium 703 storing instructions executable by a processor 702 to perform SLAM initialization. In some implementations, the instructions are executable by the processor 702 to perform methods such as the example methods of FIG. 1, 2, or 4. For example, the example system 700 may be an implementation of the example system 500 of FIG. 5.

The example system 700 may include an input/output (I/O) system 701 to receive a video. For example, the I/O system 701 may include a camera interface to receive pre-recorded or live video from the camera. As another example, the I/O system 701 may include a network or data interface to receive pre-recorded or live video.

The example system 700 may further include a processor 702 coupled to a non-transitory computer readable medium 703. For example, the medium 703 may include memory such as random access memory (RAM) or flash memory, storage volumes such as hard disks or solid state volumes, or a combination thereof.

The medium 703 may store instruction set 704. Instruction set 704 may include instructions executable by the processor 702 to obtain a first video frame and a second video frame. For example, the instruction set 704 may be executable by the processor 702 to perform blocks 201 and 203 of FIG. 2 or block 401 and 402 of FIG. 4.

The medium 703 may further store instruction set 705. Instruction set 705 may include instructions executable by the processor 702 to a first feature set from the first video frame. The instructions 705 may be further executable by the processor 702 to extract a second feature set from the second video frame, such that elements of the first and second feature set form corresponding pairs of features. For example, instruction set 705 may be executable by the processor to perform block 101 of FIG. 1.

In some implementations, the instruction set 705 may include further instructions executable by the processor 702 to extract the feature sets by extracting features of the first video frame and extracting features of the second video frame. The instructions 705 may then be executable by the processor 702 to identify the corresponding features from the extracted features of the first and second video frames. For example, the instruction set 705 may be executable by the processor to perform blocks 202, 204, and 205 of FIG. 2.

The medium 703 may further store instruction set 706. Instruction set 706 may include instructions executable by the processor 702 to a translation between the first feature set and the second feature set. For example, instruction set 705 may be executable by the processor 702 to perform block 103 of FIG. 1.

In some implementations, the instruction set 706 may include further instructions executable by the processor 702 to estimate the translation by estimating a 2D transformation from the first feature set to the second feature set. For example, the instructions 706 may be executable to perform block 207 of FIG. 2. In further implementations, the instruction set 706 may include instructions to estimate the 2D transformation as described with respect to FIG. 3.

The medium 703 may further store instruction set 707. Instruction set 707 may include instructions executable by the processor 702 to use the first and second frames for SLAM initialization if the number of corresponding pairs and the translation meets a joint condition. For example, instruction set 707 may be executable by the processor 702 to perform blocks 104-105 of FIG. 1.

In some implementations, the instruction set 707 may include instructions executable by the processor 702 to execute instruction sets 704-706 to compare subsequent video frames with the first video frame until the joint condition is met. For example, the instruction set 707 may cause the processor 702 to perform this operation if the joint condition on correspondences and translation is not met. Once the joint condition is met, the instruction set 707 may use the frames that meet the thresholds for SLAM initialization. For example, the instruction set 707 may be executable by the processor 702 to perform blocks 208 and 209 of FIG. 2.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

The invention claimed is:

1. A method, comprising:
obtaining, by a processor of a computing device, first and second video frames;
determining, by the processor, whether a total number of corresponding features between the first and second video frames exceeds a correspondence threshold;
in response to a determination that the total number of corresponding features exceeds the correspondence threshold, performing, by the processor, a two-dimensional (2D) transformation, including a 2D translation, from the features in the first video frame to the features in the second video frame;
determining, by the processor, whether a magnitude of the 2D translation exceeds a translation threshold; and
using the first and second of video frames for initialization of a simultaneous localization and mapping (SLAM) method in response a determination that the magnitude of the 2D translation exceeds the translation threshold.

2. The method of claim 1, further comprising:
obtaining the corresponding features from the first and second video frames, each pair of the corresponding features including a feature from the first video frame and a corresponding feature from the second video frame.

3. The method of claim 2, wherein obtaining the corresponding features comprises:
extracting features in the first video frame;
extracting features in the second video frame; and
identifying the corresponding features from the extracted features of the first and second video frames.

4. The method of claim 1, wherein performing the 2D transformation further includes performing a 2D rotation from the features in the first video frame to the features in the second video frame.

5. The method of claim 1, wherein performing the two-dimensional transformation comprises:
centering the features of the first video frame by subtracting a first centroid from the features of the first video frame;
centering the features of the second video frame by subtracting a second centroid from the features of the second video frame;
calculating a correlation matrix from the centered features of the first video frame and the centered features of the second video frame;
calculating a rotation from the centered features of the first video frame to the centered features of the second video frame to obtain a rotated first centroid; and
calculating the 2D translation by vector joining the rotated first centroid and the second centroid.

6. The method of claim 1, further comprising: if the magnitude of the 2D translation does not exceed the translation threshold:
obtaining a third video frame;
obtaining corresponding features between the first video frame and the third video frame;
in response to a determination that a total number of corresponding features between the first and third video frames exceeds the correspondence threshold, performing a second 2D transformation, including a second 2D translation, from the features of the first video frame to the features of the third video frame; and
using the first video frame and the third video frame as initial frames in the SLAM method in response to a determination that a magnitude of the second 2D translation exceeds the translation threshold.

7. A system, comprising:
a processor; and
a memory storing instructions that when executed cause the processor to:
detect a first set of rays from a first video frame and a second set of rays from a second video frame, each ray from the first set and a corresponding ray from the second set representing a common feature in the first video frame and the second video frame;
determine whether a total number of common features in the first and second video frames exceeds a correspondence threshold;
in response to a determination that the total number of common features exceeds the correspondence threshold, estimate a two-dimensional (2D) transformation, including a 2D translation, from the first set of rays to the second set of rays;
determine whether a magnitude of the 2D translation exceeds a translation threshold; and
determine that the first video frame and the second video frame are suitable as initial frames for simultaneous localization and mapping (SLAM) based on a determination that the magnitude of the 2D translation exceeds the translation threshold.

8. The system of claim 7, wherein the instructions are to cause the processor to:
perform a SLAM initialization using the first video frame and second video frame as initial frames.

9. The system of claim 7, wherein the 2D transformation further comprises a 2D rotation.

10. A non-transitory computer readable medium storing instructions executable by a processor to:
obtain a first video frame and a second video frame;
extract a first feature set from the first video frame;
extract a second feature set from the second video frame, elements of the first and second feature sets forming corresponding pairs of features;
determine whether a total number of common features between the first and second video frames exceeds a correspondence threshold;
in response to a determination that the total number of common features exceeds the correspondence threshold, perform a two-dimensional (2D) transformation, including a 2D translation, between the first feature set and the second feature set;
in response to a determination that a magnitude of the 2D translation exceeds a translation threshold, use the first video and the second video frame for simultaneous localization and mapping (SLAM) initialization.

11. The non-transitory computer readable medium of claim 10, wherein the instructions are to cause the processor to:
if the magnitude of the 2D translation does not exceed the translation threshold, compare subsequent video frames with the first video frame until the 2D translation between one of the subsequent video frames and the first video frame exceeds the translation threshold and the total number of common features exceeds the correspondence threshold, and use the subsequent video frame and first video frame for SLAM initialization.

12. The non-transitory computer readable medium of claim 10, wherein the instructions are to cause the processor to extract the first feature set and the second feature set by:
extracting features of the first video frame;
extracting features of the second video frame; and
identifying the common features from the extracted features of the first and second video frames.

13. The non-transitory computer readable medium of claim 10, wherein to perform the 2D transformation, the instructions are further to cause the processor to perform a 2D rotation from the first feature set to the second feature set.

14. The non-transitory computer readable medium of claim 10, wherein the instructions are to cause the processor to perform the two-dimensional transformation by:
centering the first feature set by subtracting a first centroid from the first feature set;
centering the second feature set by subtracting a second centroid from the second feature set;
calculating a correlation matrix from the centered first feature set and the centered second feature set;
calculating a rotation from the centered first feature set to the centered second feature set to obtain a rotated first centroid; and
calculating the 2D translation by vector joining the rotated first centroid and the second centroid.

15. The system of claim 7, wherein, to estimate the 2D transformation, the instructions are to cause the processor to:
center the first set of rays in the first video frame by subtracting a first centroid from the first set of rays;
center the second set of rays in the second video frame by subtracting a second centroid from the second set of rays;
calculate a correlation matrix from the centered first set of rays and the centered second set of rays;
calculate a rotation from the centered first set of rays to the centered second set of rays to obtain a rotated first centroid; and
calculate the 2D translation by vector joining the rotated first centroid and the second centroid.

16. The system of claim 7, wherein, in response to a determination that the magnitude of the 2D translation does not exceed the translation threshold and the total number of the common features does not exceed the correspondence threshold, the instructions are to cause the processor to:
compare subsequent video frames with the first video frame until the magnitude of the 2D translation between one of the subsequent video frames and the first video frame exceeds the translation threshold and the total number of the common features exceeds the correspondence threshold, and
use the subsequent video frame and first video frame for initialization of the SLAM method.

* * * * *